United States Patent [19]

Leiber et al.

[11] Patent Number: 4,771,849
[45] Date of Patent: Sep. 20, 1988

[54] SYSTEM FOR CONTROLLING THE FUEL SUPPLIED TO AN AUTOMOTIVE ENGINE

[75] Inventors: Heinz Leiber, Oberriexingen; Wolfgang Korasiak, Bietigheim; Dieter Roller, Vaihingen; Alfred Sigl, Gersheim; Eberhard Schnaibel, Hemmingen; Franz Brugger, Winnenden, all of Fed. Rep. of Germany

[73] Assignee: Robert Bosch GmbH, Stuttgart, Fed. Rep. of Germany

[21] Appl. No.: 20,144

[22] Filed: Feb. 25, 1987

Related U.S. Application Data

[63] Continuation of Ser. No. 732,500, May 9, 1985, abandoned.

[30] Foreign Application Priority Data

May 9, 1984 [DE] Fed. Rep. of Germany ....... 3417089

[51] Int. Cl.⁴ ............................................. B60K 15/00
[52] U.S. Cl. ..................................... 180/197; 74/866; 74/871; 180/282; 180/335
[58] Field of Search ............... 180/197, 282, 284, 335, 180/170; 74/865, 866, 871; 246/182 B, 182 C; 105/61

[56] References Cited

U.S. PATENT DOCUMENTS

| | | | |
|---|---|---|---|
| 3,627,074 | 12/1971 | Binckhardt | 180/197 |
| 3,689,263 | 4/1972 | Gunsser | 180/197 |
| 3,752,249 | 8/1973 | Gelenius | 180/197 |
| 3,776,357 | 12/1973 | Arai | 180/335 |
| 4,432,430 | 2/1984 | Lind | 180/197 |
| 4,554,990 | 11/1985 | Kamiya | 180/197 |

FOREIGN PATENT DOCUMENTS

| | | | |
|---|---|---|---|
| 0106360 | 4/1984 | European Pat. Off. . | |
| 3143666 | 5/1983 | Fed. Rep. of Germany | 180/197 |
| 3142620 | 5/1983 | Fed. Rep. of Germany | 180/335 |
| 3237672 | 4/1984 | Fed. Rep. of Germany | 180/197 |
| 36731 | 3/1983 | Japan | 180/197 |
| 167845 | 10/1983 | Japan | 180/197 |
| 570958 | 7/1945 | United Kingdom | 180/197 |
| 078323 | 1/1982 | United Kingdom | 180/197 |

Primary Examiner—John J. Love
Assistant Examiner—Everett G. Diederiks, Jr.
Attorney, Agent, or Firm—Frishauf, Holtz, Goodman & Woodward

[57] ABSTRACT

An automotive engine forming part of a motor vehicle is controlled to avoid slipping or spinning of a driven wheel by controlling the maximum rate of change of fuel which can be supplied to the engine, for example, by limiting the speed of deflection of a throttle flap (6) driven by a servo motor (7). The deflection speed, limited for example by a voltage divider (14) can be controlled as a function of operating parameters of the engine or the vehicle, for example, vehicle speed ($V_F$), engine speed ($n_M$), engine loading or a percentage of engine loading, actual wheel slip, actual angle or deflection position of the throttle flap, and the like. Further, non-linearities between deflection of an operator actuated pedal, such as a gas pedal (1) and actual deflection of the control flap (6) can be compensated for, for example, in a difference forming circuit (9) providing an output error signal for the servo motor (7) or by software, e.g. by recourse to non-linear characteristics stored in a table or graph. The duration of limiting can be determined by timing circuit connected to a terminal (p) for example, on the voltage divider (14). The system can be instrumented electrically (FIG. 2) or, for example, hydraulic-electrically (FIG. 3).

6 Claims, 2 Drawing Sheets

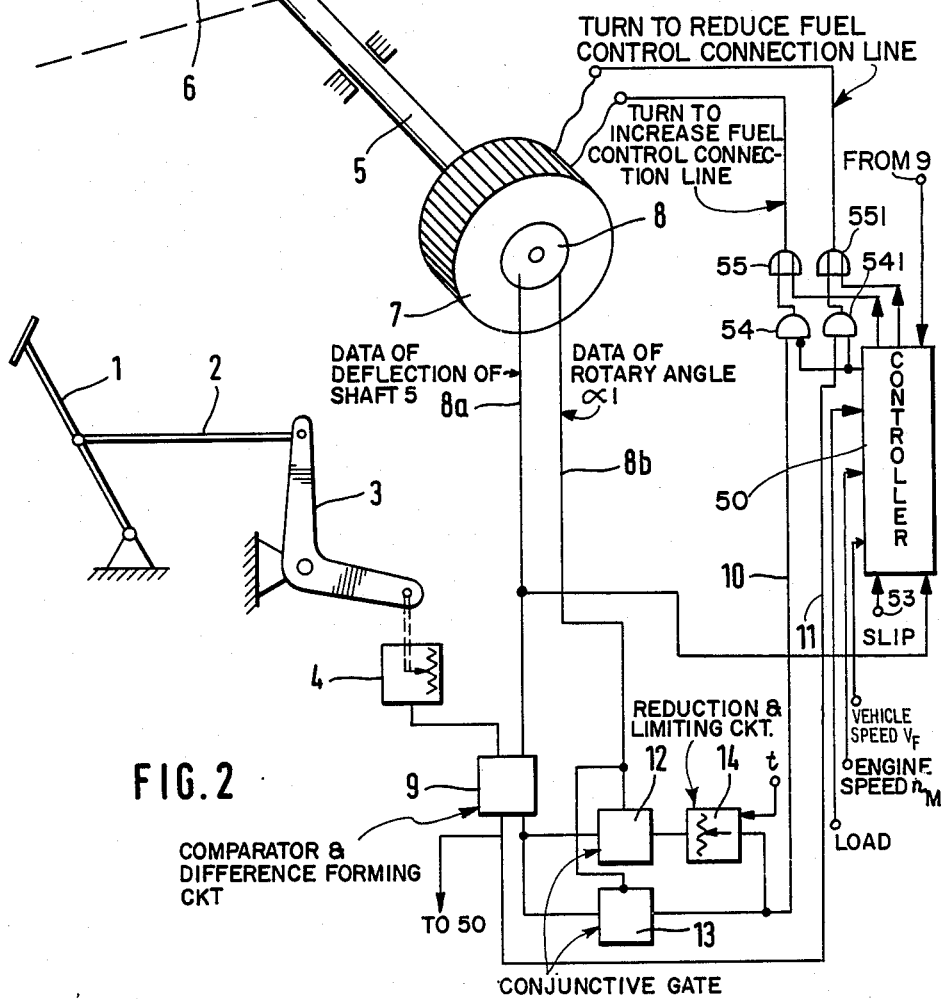

SYSTEM FOR CONTROLLING THE FUEL SUPPLIED TO AN AUTOMOTIVE ENGINE

This application is a continuation of application Ser. No. 732,500, filed May 9, 1985, abandoned.

The present invention relates to a way to control an automotive internal combustion engine (ICE) and to a system therefor; and more particularly to prevent spinning or slipping of driven wheels.

BACKGROUND

It has previously been proposed to control operation of of an automotive ICE such that the power output from the engine or the torque thereof is reduced if wheel slippage is sensed, or incipient wheel slippage is determined. Pilot control of automotive engines to accomplish this function is known, for example described in German Patent Publication Document DE-OS No. 31 27 302 to which U.S. Pat. No. 4,484,280, Brugger et al., corresponds. A driven arrangement or system or method as therein described is usually coupled with a control arrangement in which, if slippage at a driven wheel is sensed, the so driven wheel is braked.

THE INVENTION

It is an object of the present invention to control the engine of the automotive vehicle in such a manner that its torque output will be an optimum.

Briefly, the engine is controlled by controlling the maximum rate of change of fuel supply to the engine when a tendency of the wheels to slip or to spin is determined. Preferably, this control is effected before a control of the maximum absolute level of engine torque or output is effected, for example by limiting the fuel which is being supplied to the engine. A previously higher setting, or suddenly higher setting, for example due to the operator pressing down on an accelerator pedal, is thereby controlled with respect to actual fuel supply, so that the slippage of wheels is prevented. It is readily possible to also consider a non-linear relationship between change in fuel control setting, for example change in the throttle of an Otto-type motor, or change in fuel supply to a Diesel engine, and output delivered by the engine at various speed levels.

The inventors noted that the fuel supply, upon sudden depression of the fuel control, for example the "gas pedal" or "fuel pedal" of an ICE, will follow the rate of change of the position of the respective pedal, resulting in a substantial and very high rate of change of fuel supply as well. The pedal may rapidly reach a terminal or limit position, that is, maximum fuel, which in a throttle may be a 90° position of the throttle element within the induction pipe. The throttle may reach this position before the wheels actually start to slip—yet the particular rate of change and the end position will result in a tendency of the wheels to slip. The engine, however, is often capable of delivering required power, without slippage, at a substantially lower position of the fuel supply control element—e.g. the throttle—before the limiting position is reached, for example already at a 45° position of the throttle flap. Consequently, in order to prevent slippage of the wheels, and after the throttle has been deflected to its full extent, e.g. 90°, it would then be necessary to reduce the position of the throttle to the referred-to intermediate level by a substantial angle, in the example selected by half of maximum position, that is, to about 45°, before a substantial reduction in the torque delivered by the engine will actually result. This requires an undue time period.

In accordance with a feature of the invention, only a limited rate of change of fuel supply is permitted upon operation of the fuel controller to maximum fuel supply at a high rate of change or gradient of the position of the fuel controller. Thus, the rate of change of the position of the fuel controller is not directly reflected in a similar maximum rate of change or gradient of the fuel control element, and hence the fuel which is actually supplied.

Reducing the maximum rate of change of fuel supply, upon deflection of the fuel supply controller, does not substantially limit acceleration of the vehicle in the presence of high frictional values between the wheels and the road; yet, the operation of the vehicle upon occurrence of low frictional values, when so controlled, substantially improves vehicle operation. It is well known that the relationship between engine torque and fuel supply controller position—e.g. position of a throttle or injection elements—is non-linear. This non-linearity, preferably, is also considered in the control method and system.

Various systems can be used to carry out the method and concept above described. For example, it is possible to introduce an electrical, mechanical or hydraulic arrangement between the operator controlled engine controller, i.e. a pedal and the throttle or fuel injection element, forming part of a fuel supply element which reduces maximum rate of change of the fuel supplied by the element for a limited period of time, or reduces the maximum possible change which the fuel supply element may carry out. Limitation can be effected based on various parameters, and in various ways. For example, the fuel supply element may be limited in change only from a predetermined position beyond the idle or minimum position. This predetermined position of the fuel control element may depend, for example, on the speed of the engine; the predetermined position may be that, at which a predetermined portion of full load is reached, for example 90% of full loading of the engine. The limitation may also become effective if, for example, the rate of change of the fuel supply controller exceeds a predetermined limit for a predetermined period of time. It is also possible to associate various ranges of fuel supply control position with different rates of change of positions, for example by associating various angular ranges of a throttle flap opening angle with maximum rate of change of the throttle flap angle. It is also possible to reduce the maximum rate of change of the fuel supply when a tendency of slippage or spinning of a driven wheel is sensed. Sensing actual spinning and limiting the rate of change of fuel supply will prevent excessively fast increase in output of motor torque.

The control of the drive torque of the ICE in an automotive vehicle can be further improved by setting the fuel supply element to a predetermined maximum fuel supply position, for example to a throttle angle of, typically, about 45°. Alternatively, when control is initiated and the fuel supply element has exceeded the set point—e.g. 45°—the fuel supply element is reset to the predetermined set point.

For example, a throttle which had already reached a greater angle than 45° is reset to that value of 45°. In accordance with a preferred feature of the method, a calculation is carried out to determine the predetermined or preset position of the fuel supply controller, for example of the angle of the throttle flap at the beginning of the control function. The calculation considers the vehicle speed $V_F$, error or control of actual engine performance from controlled engine performance, RA, instantaneous position of the fuel supply control element—typically the instantaneous angle of the throttle—and engine speed $n_{(M)}$. A further consideration can be introduced into the calculation, namely whether only one or two or more driven wheels are subject to slippage or spinning. This resetting can be used—even without limiting the maximum rate of change or speed of adjustment of the fuel supply control element, and may lead to rapidly reaching the optimum fuel supply value for optimum output without slippage of wheels.

For optimizing the ICE-control it is of advantage to introduce a lower limit below which the fuel supply control element may not fall or operate during control, since, below a predetermined minimum fuel supply position, slippage of the wheels cannot occur in any event. This is particularly appropriate in vehicles having manually controlled transmissions since limiting the position of the fuel supply element to a predetermined minimum value, for example the throttle to a predetermined minimum angle, prevents stalling of the engine. The minimum angle will depend on engine speed, as well as vehicle speed, and preferably varies as a function of vehicle and engine speeds.

The method can be further improved and rendered more accurate by weighting the output values of the drive torque control in dependence on instantaneous position of the fuel controller, to thereby accomodate non-linear engine torque characteristics. Weighting can easily be carried out by electronic circuitry, which already retains in a memory engine and gear and speed relationships, as well as other engine parameters, for example the non-linear relationships of engine output and fuel being supplied. When applied to an Otto-type motor, the following relationship can be used to determine a minimum throttle flap angle or position:

minimum throttle value =

$$\text{Min} (DKI); \text{ or} \quad (1)$$

$$\left( 25° + \frac{0.5°}{\text{km/h}} \cdot V_F - \frac{1°}{\text{km/h}} \cdot RA - \frac{0.1°}{1/\text{Min}(DKI)} \cdot n_M \right) \quad (2)$$

Minimum value is the lower one of either: (1) the value DKI, or (2) the value according to the parenthetical relationship, wherein, $V_F$ is vehicle speed, RA is error or non-conformity of actual deflection of the throttle, in degrees, from commanded deflection, $n_M$ is engine speed and Km/h vehicle speed. The minimum value, based on the long parenthetical relationship may be divided by 2 if two or more driven wheels actually slip or spin.

Various other weighting factors can be introduced in order to provide for linear effective output relationships, for example if a value is derived from a logic circuit or computation circuit which should be matched or weighted to a non-linear operating characteristic. In accordance with a particularly simple arrangement, and suitable for an Otto-type motor, fixed factors may be introduced:

| | |
|---|---|
| throttle flap position DKI < 20° | weighting factor 0.5 |
| throttle flap position DKI betw. 20° and 60° | weighting factor 1.0 |
| throttle flap position DKI > 60° | weighting factor 4.0 |

DRAWINGS

FIG. 1 is a diagram of angle of a throttle of an Otto engine, with respect to time (abscissa) to illustrate the method of the present invention;

FIG. 2 is a highly schematic diagram of a system in accordance with the present invention and to carry out the method;

Figure 3:
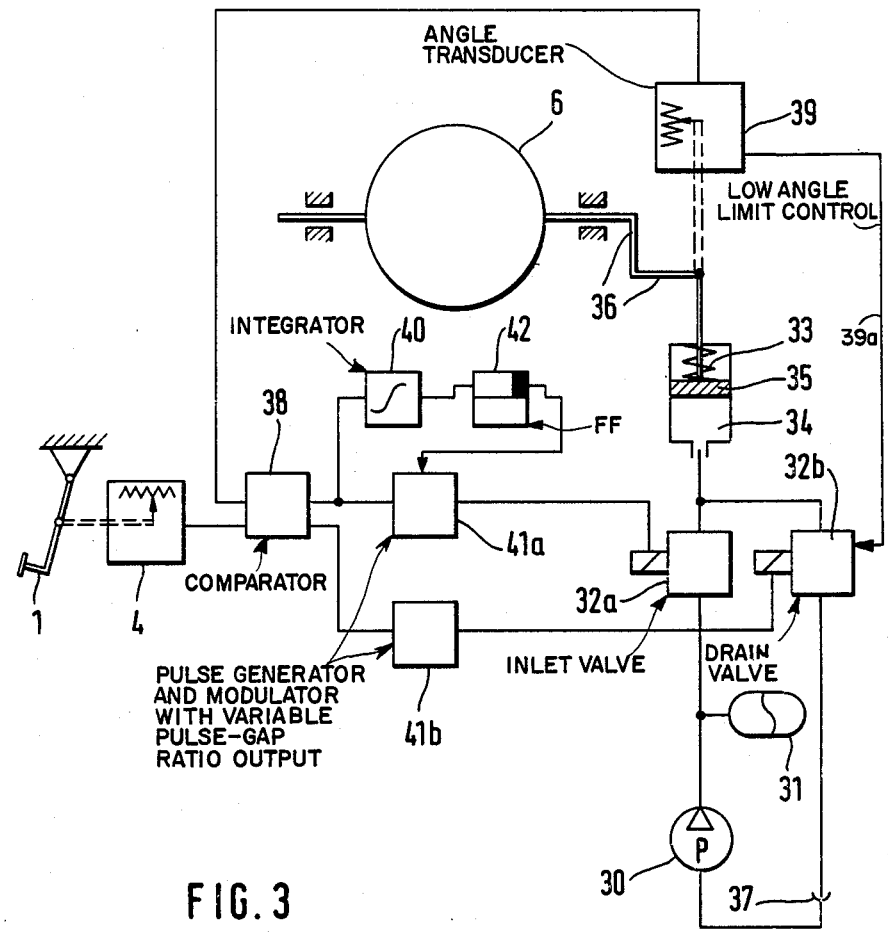

and FIG. 3 illustrates another embodiment of a system in accordance with the present invention to carry out the method, and utilizing a hydraulic control arrangement.

DETAILED DESCRIPTION

Referring first to FIG. 1, in which the throttle angle is shown in the ordinate, with respect to time, upon rapid and extensive deflection of the fuel pedal, or gas pedal of an Otto-type internal combustion engine (ICE) the control effected in accordance with the method and system of the present invention is likewise shown.

At the time 0, the accelerator pedal is depressed by an operator rapidly to provide for substantial increase in fuel supplied to the engine. Up to the time $t_1$ the throttle will follow the deflection Q of the gas pedal, with a rate of deflection of $\dot{\alpha}_{Max}$. This is a maximum rate of change of the throttle. Starting at $t_1$, and in accordance with the present invention, the rate of change will drop to the rate $\alpha_B$. This rate is maintained up to a time instant $t_2$. After time $t_2$, the torque output of the ICE is controlled, for example based on sensed slippage of wheels, or sensed tendency of wheels to slip.

The value of the rate of change, $\dot{\alpha}_{Max}$ could be an optimized value.

FIG. 1 also shows, in a broken line curve, the course of throttle deflection without the limiting in accordance with the present invention.

Limiting the rate of throttle deflection, or fuel supply can be done in various ways and FIG. 2 illustrate one suitable system.

A gas pedal 1 is coupled by a suitable coupling, shown schematically simply as a link 2 and lever 3 to a position signal transducer 4 which provides an electrical output representative of deflection of the gas pedal from a base or idle or undeflected position. The output signal from transducer 4 is then processed as will appear.

A throttle flap or throttle valve element 6 is secured to a shaft 5 which is rotated by a reversible motor 7. The reversible motor 7 is coupled to an angle transducer 8 which provides an output signal representative of the actual deflection of the throttle flap 6 on line 8a.

The output signals from the command element formed by the transducer 4 and the output signal from the position transducer 8, providing an output signal representative of actual deflection are compared in comparator and difference forming circuit 9. The resulting difference signal is connected via lines 10 or 11, respectively, to control the motor to rotate in the direction to increase fuel, or to reduce fuel. Line 10 is the "increase fuel" control line or connection, and line 11 is the "reduce fuel" control line or connection. Upon sensing an error signal, formed in the comparator and difference forming circuit 9, and, depending on the direction of the error—too much, or too little fuel—the respective lines 10, 11, are energized and the motor 7, in the function of a servo motor, will rotate until the error becomes 0 or null, that is, until the throttle 6 has reached the position commanded by the command transducer 4.

In the example of FIG. 2, the angle transducer 8 has a second output line 8b which is coupled to the transducer to provide an output signal when a predetermined rotary angle $a_1$ is reached. Line 8b controls two conjunctive gates 12, 13 which are connected in the line 10, in parallel to each other. Normally, gate 13 is open, and thus passes the output signal from the comparator 9 to change the throttle angle $a$ towards a greater deflection without any influence, that is, permits rapid adjustment of the change of the throttle angle 6 upon change of the position of the gas pedal 1 as sensed by the transducer 4. When a signal is derived at line 8b, gate 13, however, will block. The signal from line 8b is connected to the gate 13 through a negating input thereon, as schematically indicated by the dot. The output signal of the comparator 9 now has to pass through the gate 12. It will be conducted through a reduction and limiting circuit 14 as a reduced signal. The reduction or limiting circuit 14, in the simplest form, may be a voltage divider or potentiometer. If the signal is reduced in amplitude, the servo motor 7 will rotate more slowly; in other words, the rate of change of deflection of the throttle flap 6 is reduced.

FIG. 3 illustrates the system with a fluid, typically hydraulic control.

Gas pedal 1, similar for example to the arrangement in FIG. 2, controls a position transducer 4 which provides an electrical output signal. The throttle flap as shown schematically at 6, may be similar in arrangement to that of FIG. 2. The adjustment or positioning of the throttle flap 6, however, is carried out hydraulically by a positioning piston 35, operating within a cylinder 34 and a counter spring 33. A pump 30 provides hydraulic pressure at a predetermined level, stored in a pressure level reservoir 31, and receives hydraulic fluid from a drain line, in which a check valve 37 is included. Control of supply, drainage from, or maintenance of hydraulic pressure within the cylinder 34 is effected by electromagnetic valves 32a and 32b, valve 32a forming a pressure inlet valve and valve 32b a pressure drainage valve.

Shift of the piston 35 is transferred to the throttle 6 in any suitable manner, for example, as schematically shown by linkage 36. The actual position of the throttle flap 6 is sensed by an angle transducer 39 which provides an output signal corresponding to the actual position of the throttle flap 6. The output signal from output transducer 39 is compared in comparator 38 with the commanded position signal from the transducer 4. Depending on the difference—and on the sign of the difference—an output signal will be provided on one or the other of the output terminals from the comparator 38, proportional to the difference. The difference signal is converted in pulse generators and modulators, having variable pulse-gap ratio outputs 41a, 41b into electrical pulses. The pulse-gap ratio depends on the difference between commanded and actual angle position of the flap valve 6. The pulses control the valves 32a, 32b, respectively, to provide either pressurized fluid to the cylinder 34 through pulse generator 41a and valve 32a if the valve flap 6 is, for example, to increase fuel supply to the ICE (not shown), or to drain pressurized hydraulic fluid under command of pulse generator 41b by selectively opening the drain valve 32b, in order to, then, reduce fuel supply to the ICE. The pulse-pulse gap radio output permits analog change of hydraulic pressure in the cylinder 34 without requiring, however, analog-operating valves, since the valves may merely open or close, in a binary mode, but for different periods of time.

The output signal of comparator 38 additionally is coupled to an integrator 40 which has a predetermined discharge rate, for example by being connected to a R/C circuit. If the difference signal derived from the comparator 38 is large, so that the charge rate of the integrator 40 exceeds the discharge rate thereof, then, after some time, a threshold will be exceeded which will be sufficiently high to trigger a bistable flip flop (FF) 42, to SET the FF 42. The output of the FF 42 is connected as a control input to the pulse generator and modulator to vary the pulse-gap ratio output thereof in a direction to reduce the pulse-pause, or gap relationship, that is, to reduce the duty cycle of the element 41a. Consequently, the maximum rate of change of position, that is, the rate of the increase of fuel supply, or change of position of the flap 6 in a direction to increase fuel supply, is reduced.

FIGS. 2 and 3, additionally, show various ways in which operating parameters of the engine, or a motor vehicle to which it is connected or of which it forms part, can be considered in the control function.

Control conditions can be applied to a controller 50 which, if the conditions exceed predetermined levels or limits, or predetermined rates, modifies the output applied on the respective lines 10, or 11 to thereby modify the operation of the servo motor 7. It is possible to modify the operation of the servo motor 7 not only in increasing, but also in decreasing direction.

An output from line 8b—as stated above—is indicative of a predetermined angular deflection of the throttle 6. Typical control conditions are: actually sensed real slippage or spinning; loading on the engine; engine speed $n_M$; vehicle speed. Wheel slip can be determined, for example, by comparing real speed and vehicle speed. The schematic drawing of FIG. 2 omits isolating circuits, buffers, and gates or the like, well known in network design, for simplicity of the illustration and for clarity of explanation of the concept. The reduction and limiting circuit 14 may be controlled by setting, for example, the reduction or limiting element, for example a potentiometer, as a function of the angle position as determined, for example, by the output on line 8a from the transducer 8; and/or in addition thereto, the time during which the limitation becomes effective, can be set by a timing input terminal t for example to determine the time between the period 0 and $t_1$—see FIG. 1. This time can be made dependent, for example, on the angle of deflection reaching only a predetermined limit.

Upon receiving an output from circuit 50, the rate of change of the deflection of the throttle 6, and hence of the fuel supply can be controlled. This control can readily be interlocked by means of a conjunctive gate, or by conjunctive relationship established, for example in dependence on slippage, in combination with sensed wheel slip. Thus, when wheel slip is sensed and communicated to circuit 50, the circuit of motor 7 will be controlled to reduce the rate of change of fuel supply.

Simultaneously, and through the negating input, the transfer of signals through circuit 13 is inbited.

Similarly, the deflection rate, or maximum deflection angle to which the throttle flap 6 can be rotated can be based on a single other operating parameter, or a combination of other operating parameters, for example based on loading of the engine at predetermined engine speeds. For example, at a predetermined engine speed, the rate of change, and/or absolute change or maximum deflection of the fuel supply controlled element formed by the throttle flap 6 can be controlled as a function of maximum engine loading, e.g. at 90% of engine loading, considering the then pertaining engine speed.

The control can also be effected based on engine speed along and/or vehicle speed.

The controller 50, known by itself, is responsive to various control conditions, only schematically shown, receives output signals from line 8a, an input indicative of wheel slip at terminal 13, and provides outputs through respective AND-gates 54, 54' and OR-gates 55, 55', coupled in lines 10 and 11, respectively. Terminal 53 provides a slip signal if a high drive slip is present, and, upon sensing such slip, blocks AND-gate 54 by an inverting input thereto, and provides over OR-gate 55 the respective control signals for the motor 7 to match the motor torque to that which is required. Controller 50, in accordance with a feature of the invention, can be so arranged that, upon sensing a slip signal at the beginning of a control cycle, a first command will be provided which causes the motor 7 to turn in such a direction to first set the flap 6 of the throttle to a predetermined position, for example 45°. To do so, the controller requires information regarding the then existing position of the flap, which is obtained from line 8a. Suitable output signals are provided to the AND-gate 54' and OR-gate 55' as well, to cause respective rotation of the motor 7. The controller 50 can receive additional input signals, for example representative of loading, engine speed $n_M$, vehicle speed $V_F$, and the like. The particular position to which the throttle flap is returned may depend, again, on engine and vehicle parameters, for example on engine speed $n_M$, vehicle speed $V_F$, and, if desired, on the output from the comparator 9, representative of difference between actual throttle position and commanded throttle position, as well as on the then pertaining actual throttle position. This then pertaining actual throttle position is signaled on the line 8a which can be connected, as a control input to the reduction and limiting circuit 14. The lower limit of throttle position may be made dependent on vehicle speed and/or engine speed, for example.

FIG. 3 illustrates, highly schematically, a low angle limit control connection 39a derived, for example, directly from the angle transducer 39 and providing an output signal when the throttle flap 6 has rotated to a predetermined minimum position. If the throttle flap 6 has reached this minimum position, the control line 39a inhibits further opening of the drain valve 32b, for example by introducing a conjunctive gate between the output from line 41b and line 39a. The particular angular position at which the line 39a will be energized can, again, be controlled as a function of various engine and vehicle parameters, for example any one, or a combination of engine speed, vehicle speed, engine loading or the like.

The method can be carried out by various other systems and, likewise, can be instrumented in the form of software in connection with automotive vheicle, and engine controllers in which the respective engine and vehicle operating parameters are sensed and derived by way of signals from suitable transducers, which signals are then processed in accordance with the method as explained to achieve the results for control respectively, of the motor 7, (FIG. 2) or of the valves 32a, 32b (FIG. 3). The system can readily be integrated with known wheel slippage or wheel spinning control systems by simple modification of existing hardware components or by modification of a control program.

Various change in modifications may be made, and features described in connection with one of the embodiments may be used for the other, within the scope of the inventive concept.

For example, the comparator 9 or the comparator 38 may include a non-linear transfer circuit which compensates for non-linear relationships between change of operator controlled change of the position of the pedal 1 and consequent output torque of the engine as controlled by deflection of the flap 6.

We claim:
1. In an automotive vehicle;
a wheel slip prevention system having;
means for controlling operation of an automotive engine in the vehicle by controlling fuel supplied thereto to avoid slipping of driven wheels, comprising:
an operator actuated controller (1);
means (4) for deriving an operating signal representative of deflection of the operator actuated controller; and
a fuel supply control means (6, 7; 33, 34, 36, 39) including a moveable element;
positioning control means for generating a positioning signal to the moveable element for adjusting fuel supply to the engine based on a given relationship with respect to deflection of the operator actuated control; and
limiting means responsive to the operating signal and coupled to the positioning control means and operative, in case of a sharp deflection of the operator actuated controller from a minimum fuel supply position, in a direction to increase the amount of fuel, above a predetermined fuel supply position, to limit the rate of adjustment of the moveable element;
said limiting means permitting the positioning control means to control the moveable element in accordance with said given relationship initially at a first high rate of change in position of the moveable element until the position of the moveable element corresponds to said predetermined fuel position, then reducing said rate of change to thereby then lower the rate of change of the amount of fuel supplied to the engine such that the rate of fuel supplied to the engine is reduced upon a tendency of the wheels to slip.

2. System according to claim 1, wherein the limiting means limit the maximum rate of change of fuel supply supplied to the engine only after a predetermined change in position of said movable element has been sensed.

3. System according to claim 1, wherein the limiting means limit the maximum change in position of the movable element from a position in which fuel supply to the engine is blocked.

4. System according to claim 1, wherein the limiting means limit the maximum rate of change in position of the movable element in dependence on the extent of deflection of the operator actuated controller.

5. The system according to claim 1, wherein the limiting means limit the maximum rate of change in position of the movable element only after the operator signal has reached a predetermined level.

6. System according to claim 1, wherein the limiting means limit the maximum rate of change in position of the movable element only after the movable element has reached a predetermined position.

* * * * *